United States Patent [19]

Barteck et al.

[11] Patent Number: 4,688,752
[45] Date of Patent: Aug. 25, 1987

[54] MOLD STRUCTURE FOR PRODUCING AN ENCAPSULATED WINDOW ASSEMBLY

[75] Inventors: Werner W. Barteck, Lasalle, Mich.; Theodore H. Gordon, Toledo, Ohio

[73] Assignee: Libbey-Owens-Ford Co., Toledo, Ohio

[21] Appl. No.: 855,966

[22] Filed: Apr. 25, 1986

[51] Int. Cl.$^4$ .................. B29C 39/18; B29C 39/28
[52] U.S. Cl. ........................... 249/85; 249/93; 249/95; 425/116; 425/127; 425/129 R
[58] Field of Search .......... 425/110, 116, 117, 126 R, 425/127, 129 R, 128; 277/DIG. 6, 226, 227; 249/83, 93, 95, 88

[56] References Cited

U.S. PATENT DOCUMENTS

| | | | |
|---|---|---|---|
| 4,296,806 | 10/1981 | Taylor et al. | 277/DIG. 6 |
| 4,375,290 | 3/1983 | Zucchi et al. | 277/DIG. 6 |
| 4,561,625 | 12/1985 | Weaver | 425/127 |
| 4,584,155 | 4/1986 | Zanella | 425/117 |

Primary Examiner—Willard E. Hoag
Attorney, Agent, or Firm—Marshall & Melhorn

[57] ABSTRACT

The present invention relates to an improved mold structure for forming a polymeric gasket around a predetermined portion of a frangible sheet such as glass. The mold structure includes two cooperating mold sections having spaced apart facing surfaces for defining a chamber for receiving the glass sheet. A seal is positioned in at least one of the mold sections about the periphery of the chamber and is utilized to resiliently support the sheet within the chamber. The seal cooperates with the mold sections and a predetermined portion of the sheet for defining a gasket forming cavity having a configuration corresponding to the gasket to be formed on the sheet of the material. An inlet communicates with the gasket forming cavity and is utilized to introduce a flowable gasket material into the gasket cavity. In the preferred embodiment of the invention, the seal includes an EPDM rubber main body portion and a removable Teflon corner section which sealingly contacts the glass sheet and forms a portion of the gasket forming cavity. The surface of the seal which contacts the glass sheet is provided with a central apex portion to reduce compression of the seal at the corner portions.

30 Claims, 11 Drawing Figures

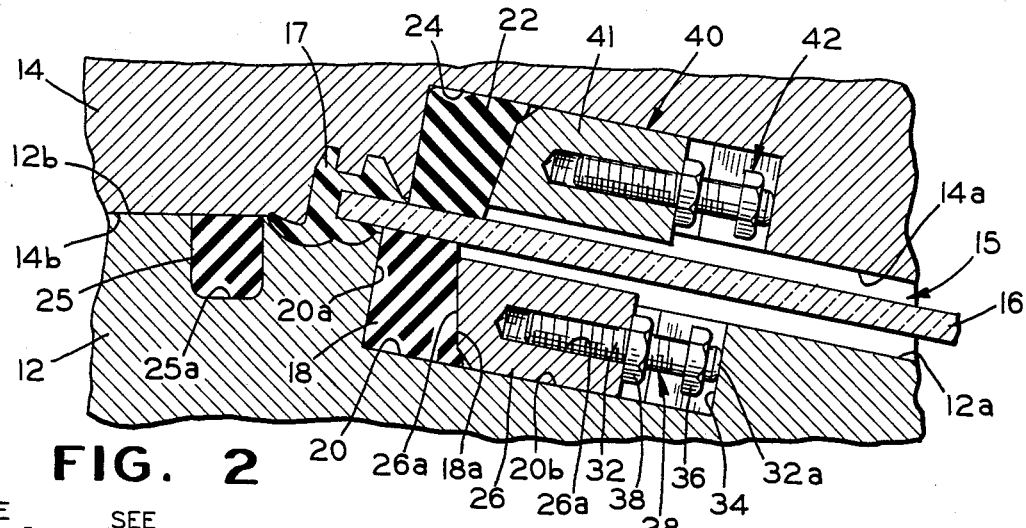
FIG. 2
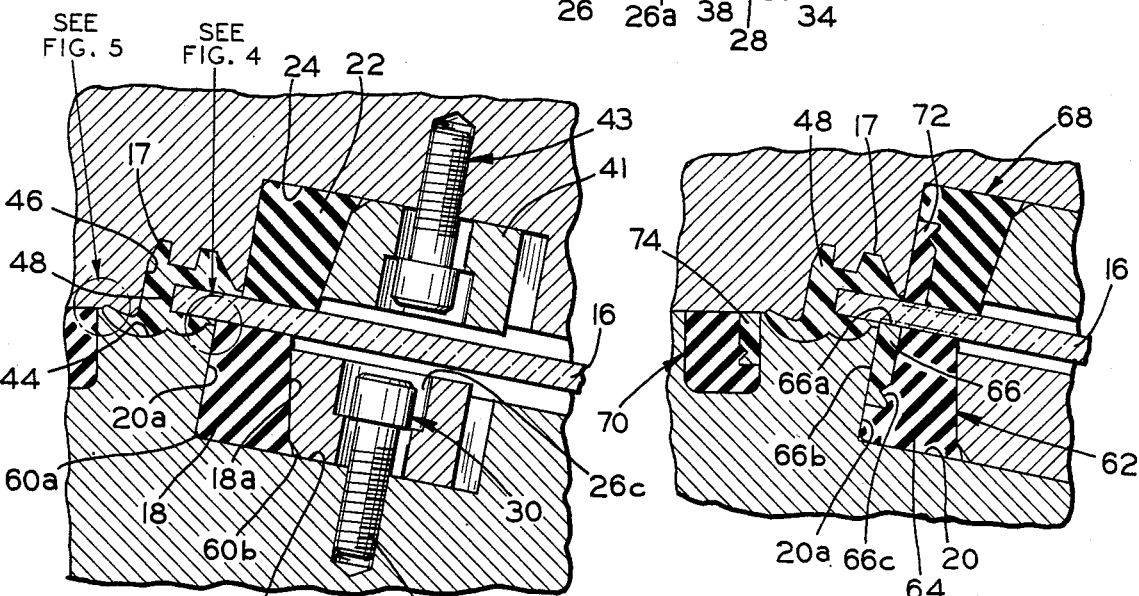
FIG. 3
FIG. 7
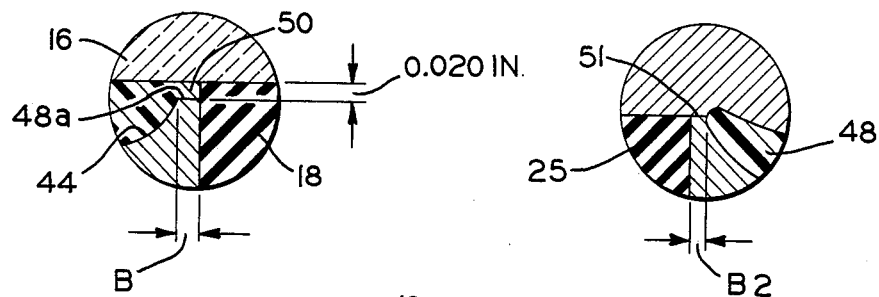
FIG. 4
FIG. 5
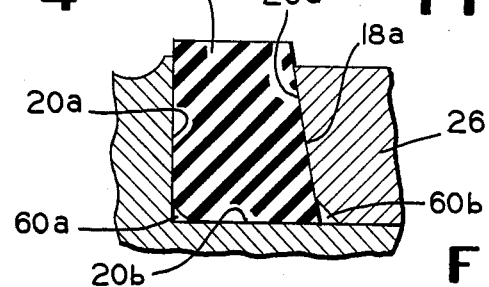
FIG. 6

MOLD STRUCTURE FOR PRODUCING AN ENCAPSULATED WINDOW ASSEMBLY

BACKGROUND OF THE INVENTION

The present invention relates generally to a mold structure for encapsulating a frangible sheet, such as glass, with a gasket. More particularly, the present invention relates to various improvements in the mold structure disclosed in U.S. Pat. No. 4,561,625 issued to William R. Weaver, assigned to the assignee of the present invention, and herein incorporated by reference. The gasket is typically formed of a polymeric material and is produced by a reaction injection molding process. The encapsulated window assembly can be shaped to constitute a vehicle windshield or backlight, for example.

Initially, windshield assemblies for vehicles were comprised of a plurality of elements including adhesive sealants applied around the marginal edges of the glass sheet, suitable mechanical fasteners such as metal clips, and exterior decorative trim strips disposed to cover the junction between the marginal edges of the glass sheet and the adjacent portion of the vehicle frame. Such window assemblies were costly, especially from a labor standpoint, since it was necessary to assemble the individual elements along the vehicle assembly line.

Subsequently, in an endeavor to improve the above window structure, unitary window assemblies of the type illustrated in U.S. Pat. No. 4,072,340 were developed. These assemblies include a sheet of glass, an adjacent frame, and a casing or gasket of molding material extending between the frame and the peripheral edge of the window to hold the sheet of glass and the frame together. The gasket was typically formed of a polyvinyl chloride material and was produced by an injection molding process.

However, due to the nature of the manufacturing process, glass sheets are typically produced with small irregularities or ripples in the surface thereof. Further, if a glass sheet is subsequently bent to have a curved cofiguration, it is difficult to produce a series of bent sheets each having the exact same dimensions. In a typical injection molding process for producing a polyvinyl chloride gasket, the polyvinyl chloride gasket material is typically injected at a relatively high pressure, generally ranging from 5,000 to 20,000 psi. Due to the high pressures involved, it is typically necessary that the mold structures have mold surfaces which engage the glass surface at a relatively high clamping pressure. Since the steel surfaces of the mold do not conform to the surface irregularity in the glass, and cannot be designed to do so, the high pressures often fracture the glass, particularly in the zones containing the irregularities.

Consequently, as disclosed in above-mentioned U.S. Pat. No. 4,561,625, W. R. Weaver developed a unique mold structure which can be utilized to form a polymeric gasket about a predetermined portion of a glass sheet by utilizing a reaction injection molding process. Since the pressures typically associated with a reaction injection molding process are less than those associated with the above described polyvinyl chloride injection molding process, the clamp tonnage required to secure and seal the glass sheet during the molding operation can be greatly reduced. Moreover, seals can be provided for resiliently supporting the glass sheet.

The mold structure of the Weaver patent includes a pair of cooperating mold sections having facing surfaces which define a glass receiving chamber for receiving a sheet of glass on which a gasket is to be formed. Seal means are provided in at least one of the facing surfaces of the glass sheet to resiliently support the glass sheet and prevent any metal-to-metal contact between the glass sheet and the mold sections inwardly of the seal means. The mold sections are provided with a gasket shaping portion which cooperates with the seal means and a predetermined peripheral portion of the glass sheet for defining a gasket forming cavity corresponding to the gasket to be formed on the sheet. In the Weaver patent, in order to precisely control the dimensions of the gasket forming cavity, at least a portion of the mold sections disposed outwardly of the gasket forming cavity are adapted to contact one another in metal-to-metal contact.

SUMMARY OF THE INVENTION

The present invention concerns an improved mold structure for forming a gasket on a predetermined portion of a frangible sheet. More specifically, the mold structure can be utilized to encapsulate a glass sheet with a polyurethane gasket formed by a reaction injection molding process. The mold structure of the present invention includes at least two cooperating mold sections having facing surfaces defining a chamber for receiving the sheet. Seal means are positioned in a groove formed in at least one of the facing surfaces of the mold section to resiliently support the sheet within the sheet receiving chamber, and to cooperate with the predetermined portion of the sheet to at least in part define a gasket forming cavity corresponding to the gasket to be formed on the sheet. Inlet means are provided for introducing a flowable gasket material into the gasket forming cavity.

The present invention relates specifically to various improvements in the specific design of the seal means, including a unique clamping arrangement to releasably retain the seal means within its associated mounting groove. In particular, in the preferred embodiment of the invention, it has been found desirable to provide a seal means which includes a main body portion formed on a resilient material such as EPDM rubber, for example, and a corner section supported by the main body portion and formed of a fluorocarbon resilient material such as Teflon, for example. The corner section is supported by the main body portion and is positioned adjacent the gasket forming cavity in the sheet when the sheet is resiliently supported within the chamber and cooperates to define a portion of the gasket forming cavity. It has been found that a seal means having such a construction produces a gasket having a smooth and undistorted boundary portion adjacent the associated glass sheet. The Teflon corner section increases the durability of the seal in the critical sealing area, and also permits improved part release and easy cleaning of the seals as a result of any undesirable flash which may extend downwardly into the associated mold section grooves.

The preferred embodiment of the seal also includes a centrally located apex portion on the surface of the seal which is adapted to be disposed in contact with the sheet. The central apex portion is substantially compressed when the sheet is being resiliently supported such that the portion of the sealing surface located distal to the apex portion remains substantially uncompressed and undistorted. Such a construction minimizes the displacement of any portion of the seal into the gasket forming cavity when the seal is compressed, thereby enabling the dimensions of the gasket forming cavity to be more precisely controlled.

Further, the gasket forming cavity of the mold structure of the present invention defines a controlled flashing area adjacent the corner section of the seal means and the surface of the sheet. This controlled flashing area is defined by a surface of the associated mold section which is adjacent the seal means and which extends generally parallel to the glass surface and is slightly spaced from the glass surface. It has been found that the controlled flashing area minimizes the portion of the seal which forms the gasket forming cavity, while still maintaining limited clearance between the glass sheet and the associated metallic mold sections.

The seal means is provided with a cross-sectional configuration wherein at least a portion of the outer surface of the seal means located in the groove is spaced from the wall of the groove to define an expansion area when the sheet is not being resiliently supported. This expansion area provides an area into which the seal means can be displaced when the sheet is resiliently supported.

In the preferred embodiment, inner seals having the above described construction are provided on both the upper and lower mold sections. Also, an outer seal can be positioned in the portion of one of the facing surfaces of the mold sections located outwardly of the gasket forming cavity. The present invention also includes a unique clamping means which can be utilized to releasably retain the inner seals within their associated grooves. This enables the seals to be easily removed and replaced in an efficient manner.

Various other improvements to the seal means are also comtemplated. For example, it has been found desirable to provide the resilient rubber seal with a fluorocarbon filler in the range of ten to twenty-five percent. Alternatively, the rubber seal can be coated with a fluorocarbon material. Also, in order to compensate for the weight of the glass sheet and to insure that the glass sheet is properly positioned within the gasket forming cavity, it has been found desirable in some instances to form the lower inner seal of a hardness greater than that of the upper seal.

BRIEF DESCRIPTION OF THE DRAWINGS

The above and other advantages of the present invention will become readily apparent to those skilled in the art from the following detailed description of the invention, and from the attached drawings, which are briefly described below.

FIG. 4 is an enlarged sectional view of a portion of FIG. 3 illustrating a controlled flashing area located along the area adjacent the contact between the glass sheet and the lower seal.

FIG. 5 is an enlarged sectional view of a portion of FIG. 3 illustrating metal-to-metal contact between the mold sections in the area between the outer seal and the gasket forming cavity.

FIG. 6 is a sectional view illustrating the lower seal of FIG. 3 prior to compression of the seal by the associated glass sheet.

FIG. 7 is a sectioal view, similar to FIG. 3, but showing an alternate embodiment of the inner upper and lower seals and the outer seal wherein a Teflon corner section is provided adjacent the gasket forming cavity.

DESCRIPTION OF THE PREFERRED EMBODIMENT

Figure 1:
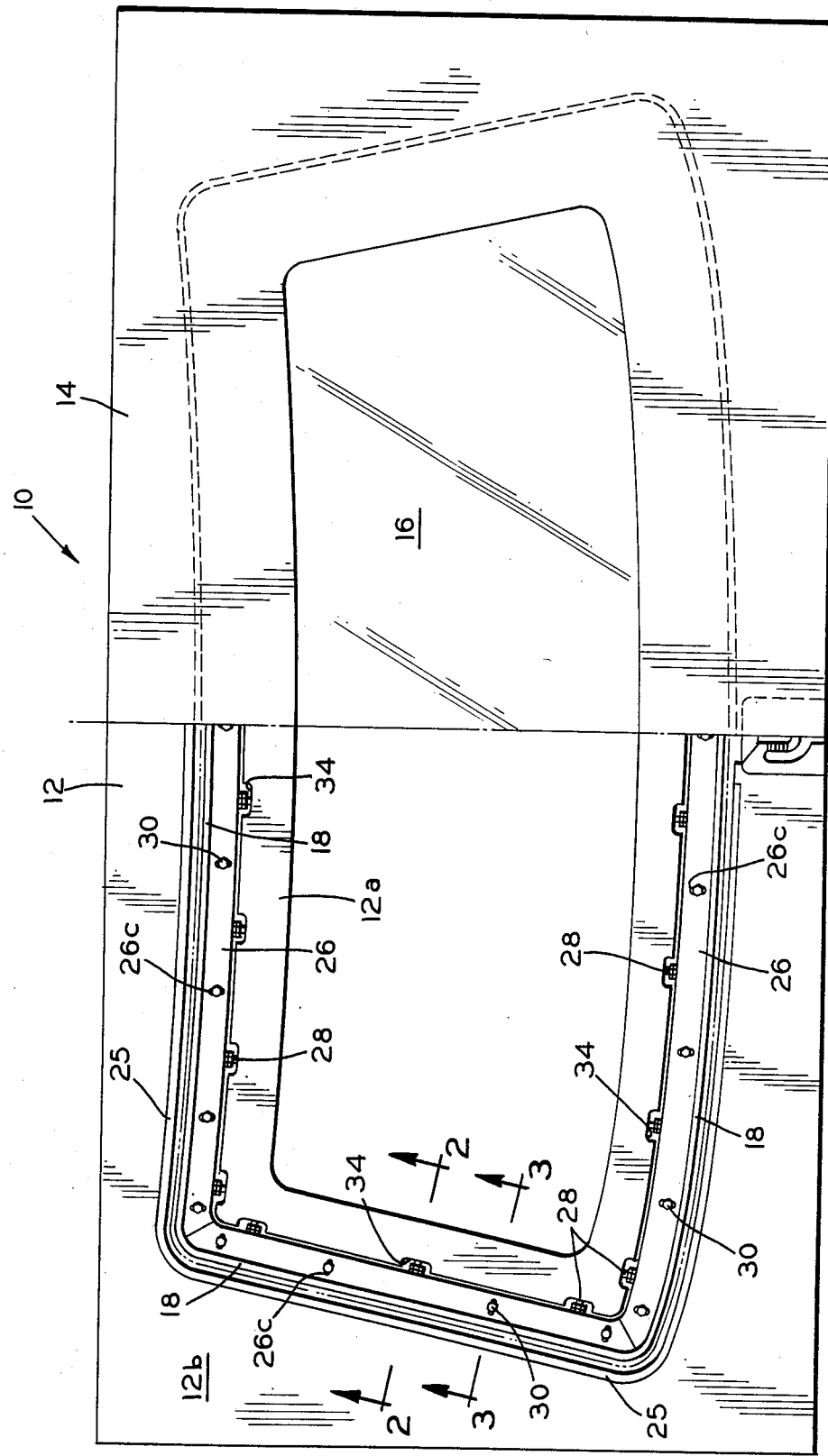
FIG. 1 is a top plan view of a mold structure according to the present invention, with the right hand portion providing a top plan view of the upper mold section, and the left hand portion providing a top plan view of the upper surface of the lower mold section.
Figure 2:
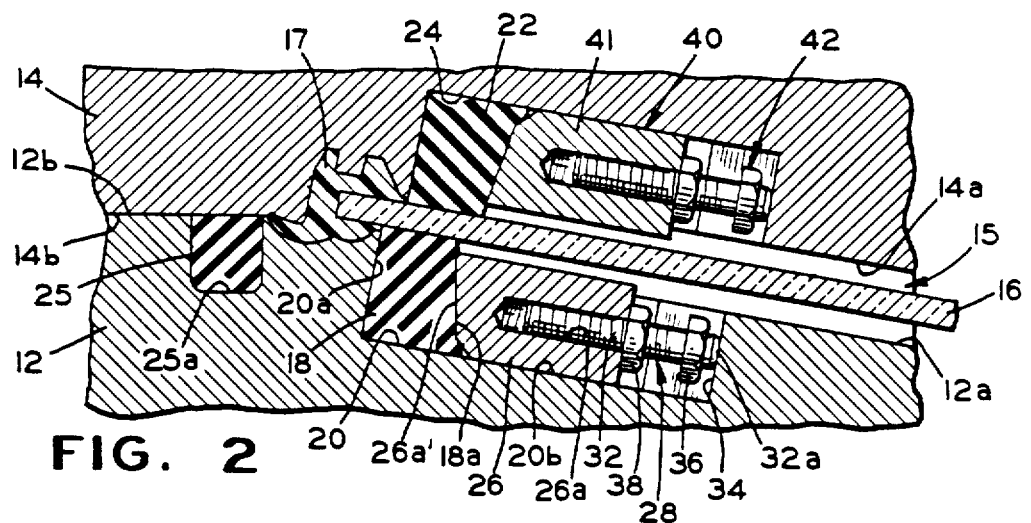
FIG. 2 is a sectional view taken along the line 2—2 of FIG. 1, but showing both the upper and lower mold sections in an assembled position with the glass sheet located therebetween.
Figure 3:
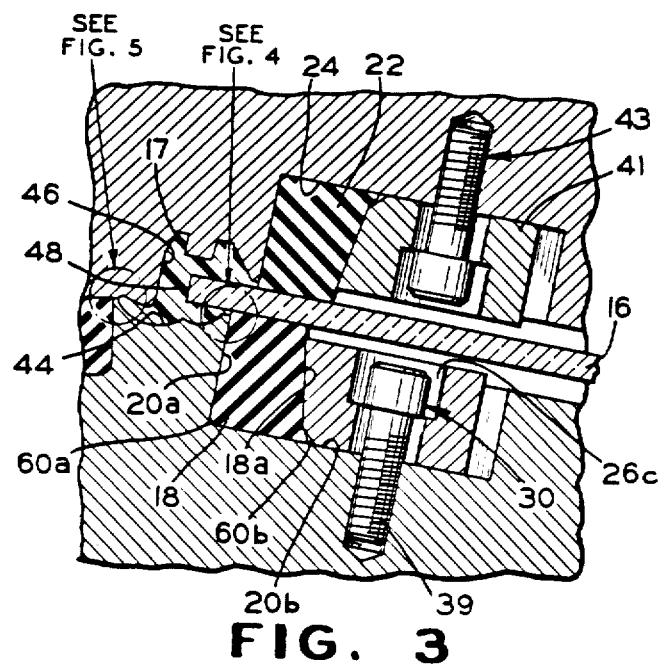
FIG. 3 is a sectional view taken along the line 3—3 in FIG. 1, but also including the upper mold section and the associated glass sheet.

Referring to FIGS. 1 through 3, there is shown a mold 10 embodying the features of the present invention. As will be discussed, the mold 10 is specifically adapted to form a gasket about the periphery of a glass sheet such as an automobile backlight, for example. The mold 10 is comprised of a ring-shaped lower section 12 (a top plan view of which is shown in the left hand portion of FIG. 1) and a ring-shaped upper section 14 (a top plan view of which is shown in the right hand portion of FIG. 1). While the mold sections 12 and 14 are typically formed of a metallic material such as steel or aluminum, for example, other types of substantially non-resilient or rigid material can be used. Suitable means, not shown, are provided to open and close the mold sections 12 and 14. Also, while not shown in the drawings, each of the mold sections 12 and 14 can be provided with suitable passageways for circulating a coolant through the respective mold sections.

As shown in FIGS. 2 and 3, the mold sections 12 and 14 are provided with recessed portions 12a and 14a respectively in facing relationship to one another such that, when the mold sections are closed, the recessed portions 12a and 14a cooperate to define a sheet receiving or glass clearance chamber 15 for receiving a glass sheet 16 on which a gasket 17 is to be formed. When the mold sections are open, the glass sheet 16 is positioned on the lower section 12 so that the outer peripheral portion of the lower surface of the glass rests on a resilient lower seal 18 positioned within a groove 20 formed in the upper surface of the lower section 12. After the glass sheet 16 is suitably positioned on the seal 18 of the lower mold section 12, the upper mold section 14 is lowered into position to enable the outer peripheral portions of the facing surfaces 12b and 14b of the cooperating mold sections 12 and 14 to be clamped together in metal-to-metal contact, as shown in FIG. 2. The upper mold section 14 carries a resilient upper seal 22 positioned in a groove 24 formed opposite the lower groove 20. The upper seal 22 cooperates with the lower seal 18 to press yieldingly against the glass sheet 16 and resiliently support the glass sheet within the glass clearance chamber 15. The lower mold section 12 also carries an outer seal 25 located in a groove 25a.

In accordance with the present invention, the lower and upper seals 18 and 22 are releasably held within their respective grooves by a unique clamping means. As shown in FIGS. 1 and 2, the lower seal 18 is removably secured within the groove 20 by a clamp means, which depending on the outer peripheral shape of the glass sheet 16, is divided into several individual clamping members 26. Each clamping member 26 is provided with a plurality of first forcing means 28 (shown in FIG. 2) which are utilized to urge the seal 18 against a side wall portion 20a of the groove 20, and is provided with a plurality of spaced apart second forcing means 30 (shown in FIG. 3) which are utilized to urge the clamping members against a lower wall portion 20b of the groove 20.

Basically, the first forcing means 28 includes an elongate threaded member 32 having one end which is threaded into a cooperating threaded aperture 26a formed in the clamping member 26, and an opposite end 32a which engages a sidewall of a clearance pocket 34. A nut member 36 is fixed to the threaded shaft 32 near the end 32a and is utilized to rotate the shaft 32 to cause the clamping member 26 to move either toward or away from the lower seal 18. The clamping member 26 is provided with a downwardly inclined surface 26a which faces and engages a cooperating upwardly inclined surface 18a formed on the seal 18. Thus, movement of the clamping element 26 toward the seal 18 causes the seal to be urged both against the sidewall 20a and the lower wall 20b. Once the threaded shaft 32 has been suitably adjusted to clamp the lower seal 18, a lock nut 38 can be rotated against the clamping member 26 to prevent relative rotation of the shaft 32 and fix the lateral location of the clamping element.

Once the lateral location of the clamping element 26 has been fixed, the second forcing means 30, illustrated in FIG. 3, can be utilized to urge the clamping element 26 against the lower surface 20b. As shown in FIG. 3, the second forcing means 30 includes a threaded bolt 38 having a lower threaded portion which is threaded into a cooperating threaded aperture formed in the lower mold section 12, and an upper head and threaded portion which are located within an elongated stepped aperture 26c formed in the clamping member 26. As shown in FIG. 1, the aperture 26c is elongated to allow lateral adjustment of the clamping element.

As shown in FIGS. 2 and 3, the upper seal 22 can be releasably secured within the groove 24 by a clamping means 40 having clamping members 41 and first and second forcing means 42 and 43 which are similar in construction to those elements associated with the lower clamping means.

Referring to FIG. 3, the lower mold section is provided with a gasket shaping surface 44, while the upper section is provided with a gasket shaping surface 46. The surfaces 44 and 46 cooperate with the upper and lower seals 22 and 18 and the predetermined peripheral portion of the glass sheet 16 to define a gasket forming cavity 48 having a configuration corresponding to a gasket to be formed about the peripheral edge of the sheet.

As shown in FIG. 4, which is an enlargement of the portion of FIG. 3 wherein the gasket shaping surface 44 meets the lower seal 18, the gasket shaping surface 44 is provided with a controlled flashing area 50 which is defined in part by a surface portion 48a which is spaced from and generally parallel to the facing surface of the glass sheet 16. In a preferred embodiment of the invention, the surface 48a is spaced from the glass sheet 16 by a relatively small distance such as 0.020 in., and extends along the surface of the glass sheet a small distance B, which can be 0.030 in. It has been found that extending the gasket shaping surface 44 upwardly toward the facing surface of the glass sheet 16 such that the surface is close to, but not touching the glass surface, produces a high quality gasket with precisely maintained dimensions. If the surface 48a is spaced too great from the glass sheet 16, the compression of the lower seal 18 causes the material to expand outwardly into the gasket forming cavity 48, thus partially deforming the desired shape of the final gasket. A similar controlled flashing area is preferably provided wherein the gasket shaping surface 46 meets the upper seal 22.

Also, in the preferred embodiment of the invention, the outer seal 25, as shown in FIG. 5, is slightly spaced from the gasket shaping cavity 48 by a distance B2, which can be approximately 0.020 in. While the outer seal could conceivably be located adjacent the gasket forming cavity, it has been found that spacing the outer seal from the gasket forming cavity enables the dimensions of the gasket shaping cavity to be more precisely controlled, since the metal-to-metal contact at 51 prevents the outer seal from being expanded outwardly into the gasket forming cavity 48.

While the lower and upper inner seals 18 and 22 and the outer seal 25 can be formed of a silicone rubber material and shaped in a manner as described in the above discussed Weaver patent, it has been discovered that varying the shape of the seals and constructing the seals of materials other than silicone can produce a window assembly having an improved gasket, along with also extending the life of the associated seals. The various embodiments of the seals which are contemplated by the present invention will now be discussed in more detail with reference to FIGS. 6 through 10.

It has been discovered that, in some instances, due to the weight that the glass sheet may impose on the lower seal 18, and as a result of the close proximity of the glass sheet to the gasket shaping surface 48a, it is desirable to constructe the lower seal 18 of a material which is substantially harder than the material in which the upper seal 22 is constructed. For example, it has been discovered that forming the lower seal 18 of a resilient material having a durometer of Shore A hardness 70, and forming the upper seal 22 of a resilient material having a durometer of Shore A hardness in the range 50 to 60, sometimes enables the glass sheet to be more precisely positioned between the gasket shaping surfaces 44 and 46.

FIGS. 2 and 3 illustrate the upper and lower seals after the glass sheet 16 has been positioned therebetween and the mold sections have been closed. Typically, the lower seal 18 is constructed with a cross section which generally conforms to the groove defined by the sidewall 20a, the lower wall 20b, and the inclined wall portion 26a of the clamping member 26. However, it has been found desirable to provide expansion areas in the groove into which the seal material 18 can expand. This minimizes the expansion of any seal material into the gasket forming cavity 48, thus altering the desired shape of the final gasket. For example, FIG. 6 illustrates the lower seal 18 prior to the time when the glass sheet 16 is placed thereon and the mold sections are closed. As shown in FIG. 6, a first expansion area 60a defined by a curved portion at the lower end of the seal 18, and a second expansion area 60b, defined by a chamfer formed on a lower corner of the clamping member 26 at the base of the surface 26a, is provided for expansion of the seal 18. Thus, when the seal is deformed, the seal will expand into the expansion areas 60a and 60b, as shown in FIG. 3.

Referring now to FIG. 7, there is shown an alternate embodiment of the lower and upper inner seals and the outer seal shown in FIGS. 2 and 3. More specifically, in the embodiment shown in FIG. 7, a lower inner seal 62 is provided with a main body portion 64 constructed of a resilient material such as nitrile or EPDM rubber, for example, and is further provided with a corner section or insert 66 constructed of a fluorocarbon material, such as commercially available under the registered trademark TEFLON from the DuPont Company of Wilmington, Del.

The insert 66 is shown disposed at the upper corner portion of the seal 62 and includes an upper surface portion 66a which sealingly contacts the downwardly facing surface of the glass sheet 16, and a side surface 66b which sealingly contacts the inner wall 20a of the groove 20. The uppermost portion of the insert surface 66b cooperates to define a portion of the gasket forming cavity 48. The insert 66 is provided with an elongate groove 66c formed near the lower end thereof which is adapted to receive a cooperating elongate projection portion from the main body 64 to prevent separation of the insert 66 from the main body 64 when the seal 62 is suitably clamped within the groove 20. The insert is substantially harder than the adjacent seals, with good results having been obtained with the use of a cast or sintered Teflon insert with a Shore A hardness of 90, plus or minus 5.

It has been found that the Teflon insert 66 increases the durability of the seal in the critical sealing region, and also produces a gasket having a sharp and smooth boundary line along the surface of the glass. Moreover, in instances wherein a gasket forming material may be forced between the surface 66b on the insert 66 and the inner wall 20a, such flashing can be easily removed and cleaned therefrom without damaging the seal 62. As shown in FIG. 7, an upper inner seal 68 and an outer seal 70 can also be provided with Teflon inserts 72 and 74 respectively having a similar construction.

Figure 8:
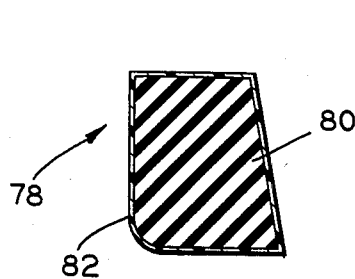
FIG. 8 is a sectional view of an alternate embodiment of a seal wherein the entire periphery of the seal is coated with a fluorocarbon material.

As an alternative to providing the seals with Teflon inserts as shown in FIG. 7, the seal can be provided with a construction as shown in FIG. 8. In FIG. 8, a seal 78 is illustrated which includes an inner resilient core member 80 of EPDM rubber having a coating 82 about its entire periphery of a fluorocarbon material. The coating is preferably formed by depositing two or three thin layers of a fluorocarbon material available under the trademark EMRALON, preferably EMRALON 312, sold by Acheson Colloids Company of Port Huron, Mich., to a thickness generally in the range of two to six mils. Alternatively, the coating 82 can be formed by shrink fitting a Teflon sleeve on the rubber core, for example by applying heat to a surrounding sleeve having a thickness on the order of one to four mils to tightly adhere same to the core. In accordance with a still further embodiment, the rubber core member 80 can include a 10 to 25 percent by weight filler of fluorocarbon material such as Teflon, for example. In these instances, the coating 82 would not be required.

Figure 9:
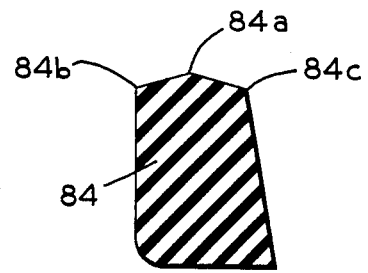
FIG. 9 is a further alternate embodiment of a seal wherein the seal is provided with a central apex portion on the portion of the seal which is adapted to contact the glass sheet.
Figure 10:
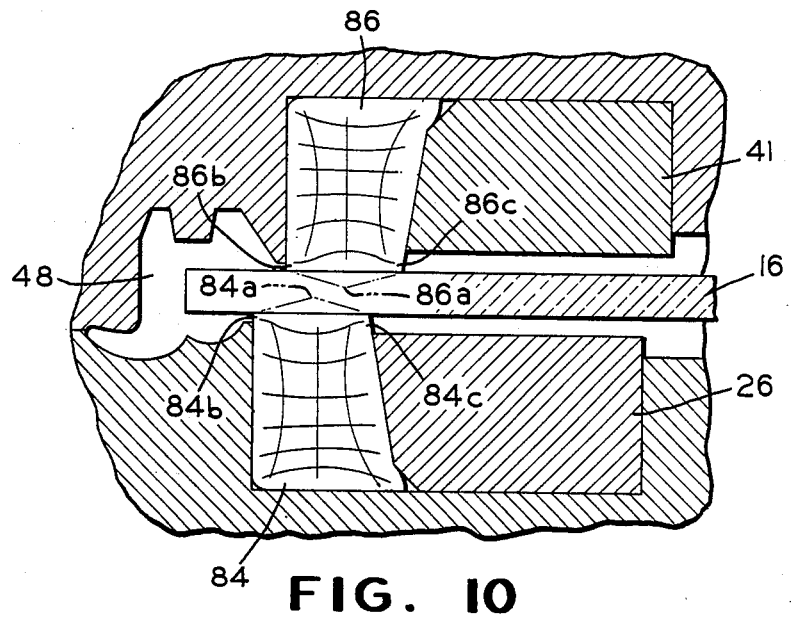
FIG. 10 is a sectional view illustrating the compression pattern of the upper and lower seals having a central apex portion provided thereon.

Turning now to FIG. 9, there is illustrated a cross section of a further alternate embodiment of a seal 84 which can be utilized with the present invention. The seal 84 is basically of the same cross-sectional shape as the seals illustrated in FIGS. 2 and 3, except the upper surface which is adapted to contact the glass sheet 16 is provided with a central apex portion 84a which is spaced upwardly from the corner portions 84b and 84c of the seal. As schematically illustrated in FIG. 10, an upper seal 86 can be provided with a similar central apex portion 86a and corner portions 86b and 86c such that, when a glass sheet 16 is positioned between the seals and the mold sections are closed, the seals 84 and 86 will be substantially compressed in the area adjacent the apex portions 84a and 86a and will be substantially uncompressed at the corner portions 84b and 86b which form a portion of the gasket forming cavity. It has been found that such a seal construction reduces any expansion of the seals 84 and 86 into the gasket forming cavity, thus presenting a smooth and undistorted boundary along this portion of the gasket forming cavity.

Figure 11:
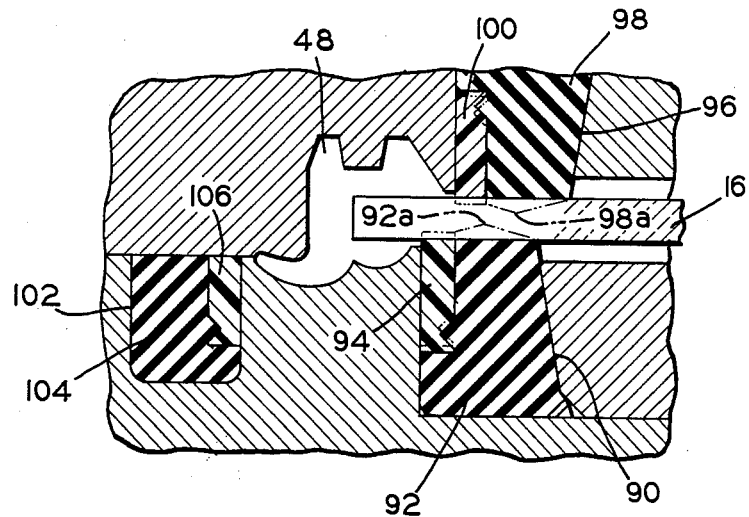
FIG. 11 is a sectional view, similar to FIG. 3, but illustrating the present preferred embodiment of the seal construction of the present invention.
Figure 1:
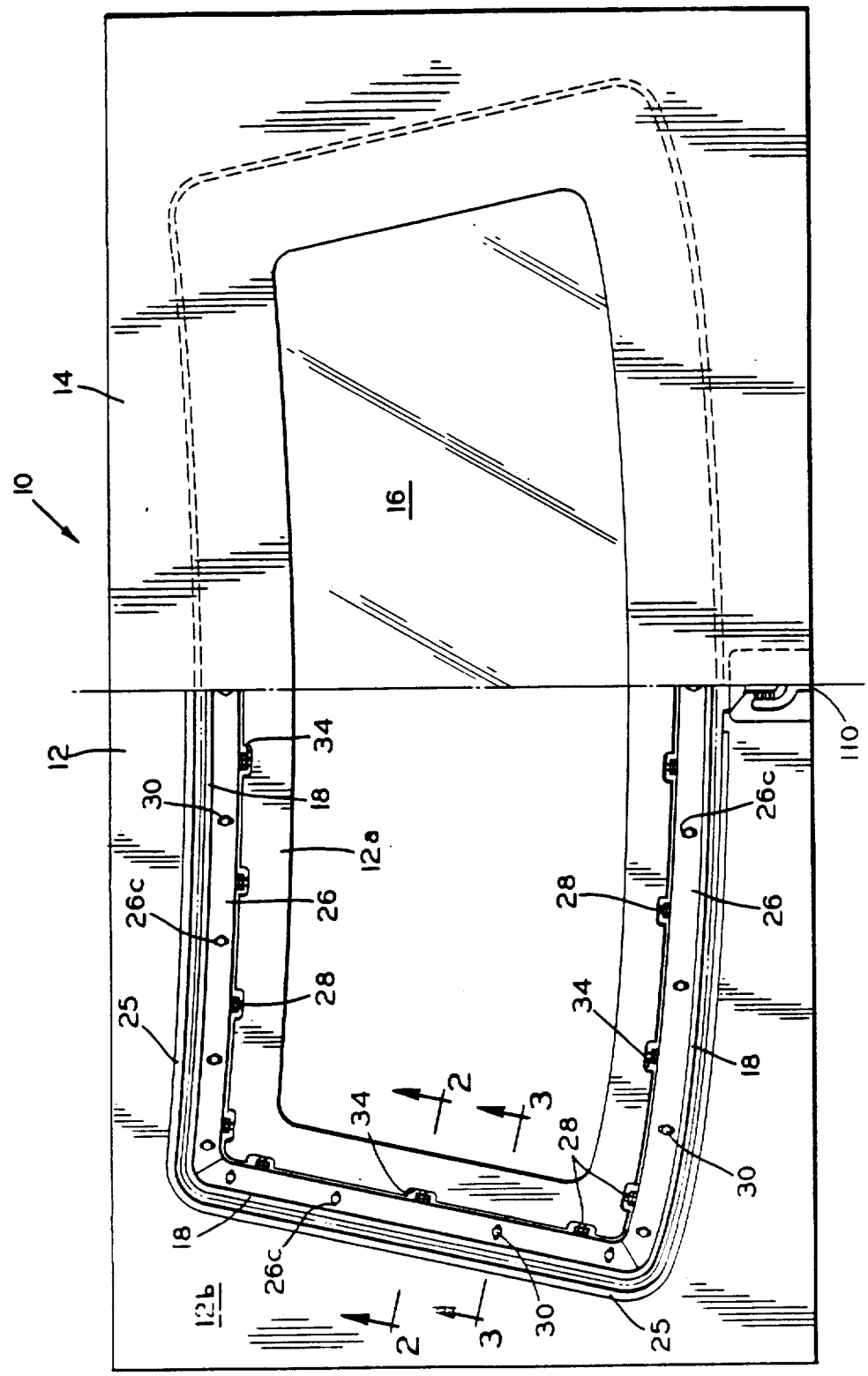

Presently, the preferred embodiment of the seal construction to be utilized in the mold structure is illustrated in FIG. 11. In FIG. 11, a lower seal 90 includes a main body portion 92 and an upper corner fluorocarbon insert 94. Preferably, the main body 92 is constructed of a Teflon-filled EPDM rubber material, while the insert 94 is comprised entirely of Teflon. Further, the main body portion 92 is provided with a central apex portion 92a similar to the seals illustrated in FIG. 9 and FIG. 10. An upper seal 96 can be constructed in a similar manner to include a Teflon-filled EPDM main body 98, and a Teflon insert 100. Further, an outer seal 102 can include a main body portion 104 of a Teflon-filled EPDM rubber material and a corner insert 106 of a Teflon material.

Prior to the formation of the gaskest 17, the sheet 16 is preferably cleaned and primed at least in the area where gasket 17 is to be applied. For cleaning, any appropriate solvent may be used, such as alcohol or ammonia. Preferably, the priming step is accomplished by first wiping the predetermined portion of the frangible sheet with a primer which is commercially available under the designation "Betaseal, glass primer 435.18 Commercial Grade" and available from Essex Chemical Company. This material is a clear moisture-sensitive compound of gamma-aminopropyltriethoxysilane, which promotes adhesion between other Betaseal products and glass. Then, a second primer layer, preferably obtained by using a product which is commercially available under the designation "Betaseal, glass primer 435.20 Commercial Grade", from Essex Chemical Company, is applied. This material is a blackout primer which prevents ultraviolet degradation of urethane materials and assists in the rapid formation of a hydrolytically stable bond between the glass and the urethane. After a drying a curing period which may vary anywhere from 15 minutes to 2 hours depending upon temperature and humidity conditions, the sheet 16 may be placed into the mold 10 for formation of the gasket 17.

The system and equipment for injecting gasket material to form the gasket 17 may be conventional, as commonly used in the reaction injection molding process, and may generally include a supply of a blend of polyol, a chain extender such as ethylene glycol, pigment, and a catalyst, and a supply of isocyanate which are separately metered by piston-type metering pumps and supplied to a mixing head inlet means 110 (shown in FIG. 1) at a pressure in the range of approximately 1,000 to 3,000 psi, and applied to mold structure 10 through the inlet means 110 at pressures of approximately 50 to 750 psi. Such a system conventionally includes a circulating pump to keep the unmixed material flowing continuously and heat exchangers to keep the unmixed material at proper temperatures.

The mold itself is preferably maintained at a stable and slightly elevated temperature of 140°-160° F., and is treated with a mold release agent. The mold sections 12 and 14 are preferably treated with a water-based mold release agent which is a salt of a fatty acid; a particular mold release agent is commercially available from Frekote Inc., Boca Raton, Fla., under the trade designation Rimlease 17.

In a specific example, which is to be construed as illustrative and not as limiting, a gasket-forming charge composed of one part by weight of a polyol composition and 0.30 part by weight of an isocyanate was forced into the mixing head at a pressure of 2000 psi and from there into the mold structure 10 at a pressure of 500 psi. The polyol and isocyanate streams were at a temperature of 110° F., while the mold structure 10 was at a temperature of 145° F. The setting time was approximately one minute. The polyol composition used in this example was a hydoxyl-terminated polyether polyol system, sold under the product name "Bayflex MP 3000-B" by the Mobay Chemical Corporation, Pittsburgh, Pa. The isocyanate used was a diphenylmethane diisocyanate (MID) prepolymer sold under the product name "Bayflex MP-3000 Component A" by Mobay Chemical Corporation.

It will also be appreciated that the claimed features may also be used in conjunction with glazings in any application where a glazing is required, including not only automotive but also architectural, appliance and boating applications.

In accordance with the provisions of the patent statutes, the principles and mode of operation of the present invention have been described in what is considered to represent its preferred embodiment. However, it should be understood that the invention may be practiced otherwise than as specifically illustrated and described without departing from the scope of the attached claims.

We claim:

1. A mold structure for forming a gasket on a predetermined portion of a frangible sheet, comprising:
   at least two cooperating mold sections having facing surfaces defining a chamber for receiving the sheet;
   seal means positioned in at least one of the facing surfaces of said mold sections to resiliently support the sheet within the sheet receiving chamber and to cooperate with the predetermined portion of the sheet to at least in part define a gasket forming cavity corresponding to the gasket to be formed on the sheet;
   said seal means including a main body portion formed of a first resilient material and a corner section supported by said main body portion and adapted to be disposed adjacent said gasket forming cavity and the sheet when the sheet is resiliently supported within the chamber, said corner section being formed of a second resilient material different from said first resilient material; and
   inlet means for introducing a flowable gasket material into the gasket forming cavity.

2. A mold structure according to claim 1 wherein said corner section is removably positioned on said main body portion.

3. A mold structure according to claim 1 wherein said seal means is disposed in a groove defined in said at least one of the facing surfaces, said groove including a wall portion which terminates along an edge defining a portion of said gasket forming cavity, said corner section including a first surface having a first portion contacting said wall portion and a second portion defining a portion of said gasket forming cavity, said corner section further including a second surface adapted to sealingly contact a surface of the sheet.

4. A mold structure according to claim 1 wherein said first resilient material includes an EPDM rubber.

5. A mold structure according to claim 4 wherein said second resilient material is a fluorocarbon material.

6. A mold structure according to claim 4 wherein said EPDM rubber material includes a fluorocarbon filler.

7. A mold structure according to claim 6 wherein said filler constitutes 10 to 25 percent by weight of said rubber material.

8. A mold structure according to claim 1 wherein said second resilient material is substantially harder than said first resilient material.

9. A mold structure according to claim 1 wherein said second resilient material is a fluorocarbon material.

10. A mold structure according to claim 9 wherein said fluorocarbon material includes Teflon.

11. A mold structure according to claim 1 wherein said seal means has a first surface adapted to be disposed in contact with the sheet when the sheet is resiliently supported in the cavity, said first surface defining an apex portion when the sheet is not being resiliently supported, said apex portion being compressed when the sheet is being resiliently supported such that portions of said first surface distal to said apex portion remain substantially uncompressed and undistorted.

12. A mold structure according to claim 1 wherein said seal means is disposed in a groove defined in said at least one of the facing surfaces, said groove defining a first wall portion, said seal means being disposed in said groove adjacent said first wall portion, and clamping means positioned in said groove for urging said seal means against said first wall portion to retain said seal means in said groove.

13. A mold structure according to claim 1 wherein said gasket forming cavity includes flashing control space adjacent the intersection of said seal means and a surface of said sheet, said flashing space being defined by the sheet and surface of said mold section adjacent said seal means and generally parallel to and spaced from said sheet.

14. A mold structure according to claim 1 wherein said seal means is positioned in a groove formed in said at least one of the facing surfaces and said seal means has a cross-sectional configuration wherein at least a portion of the outer surface of said seal means located in said groove is spaced from surfaces defining said groove to define an expansion area when the sheet is not being resiliently supported, said expansion area providing an area into which said seal means can be displaced when the sheet is resiliently supported.

15. A mold structure according to claim 1 wherein said seal means is a first seal means, and including a second seal means positioned in the portion of one of said facing surfaces of said mold sections located outwardly of said gasket forming cavity.

16. A mold structure for forming a gasket on a predetermined portion of a frangible sheet, comprising:
  at least two cooperating mold sections having facing surfaces defining a chamber for receiving the sheet;
  seal means positioned in at least one of the facing surfaces of said mold sections to resiliently support the sheet within the sheet receiving chamber, and to cooperate with the predetermined portion of the sheet to at least in part define a gasket forming cavity corresponding to the gasket to be formed on the sheet;
  said mold sections defining a flashing control space adjacent the intersection of said seal means and a surface of said sheet, said flashing control space being defined by said sheet and a surface of said mold section adjacent said seal means and generally parallel to and spaced from said sheet; and inlet means for introducing a flowable gasket material into said gasket forming cavity.

17. A mold structure for forming a gasket on a predetermined portion of a frangible sheet, comprising:
  at least two cooperating mold sections having facing surfaces defining a chamber for receiving the sheet;
  seal means positioned in at least one of the facing surfaces of said mold sections to resiliently support the sheet within the sheet receiving chamber, and to cooperate with the predetermined portion of the sheet to at least in part define a gasket forming cavity corresponding to the gasket to be formed on the sheet;
  said seal means being formed of a rubber material and including a filler of a fluorocarbon material; and
  inlet means for introducing a flowable gasket material into the gasket forming cavity.

18. A mold structure according to claim 17 wherein said rubber material is an EPDM rubber material.

19. A mold structure according to claim 17 wherein said filler constitutes 10 to 25 percent by weight of said rubber material.

20. A mold structure for forming a gasket on a predetermined portion of a frangible sheet, comprising:
  at least two cooperating mold sections having facing surfaces defining a chamber for receiving the sheet;
  seal means positioned in at least one of the facing surfaces of said mold sections to resiliently support the sheet within the sheet receiving chamber and to cooperate with the predetermined portion of the sheet to at least in part define a gasket forming cavity corresponding to the gasket to be formed on the sheet;
  said seal means having an outer surface formed of a fluorocarbon material and a core portion formed of a resilient material different from said fluorocarbon material; and
  inlet means for introducing a flowable gasket material into the gasket forming cavity.

21. A mold structure for forming a gasket on a predetermined portion of a frangible sheet, comprising:
  a pair of cooperating mold sections having facing surfaces defining a chamber for receiving the sheet;
  seal means positioned in each of said facing surfaces of said mold sections to resiliently support the sheet within the sheet receiving chamber, and to cooperate with the predetermined portion of the sheet to at least in part define a gasket forming cavity corresponding to the gasket to be formed on the sheet;
  a first of said seal means positioned in one of said mold sections being substantially harder than a second of said seal means positioned in the other one of said mold sections; and
  inlet means for introducing a flowable gasket material into the gasket forming cavity.

22. A mold structure according to claim 21 wherein said pair of mold sections includes an upper mold section and a lower mold section, and wherein said first of said seal means is positioned in said lower mold section and said second of said seal means is positioned in said upper mold section.

23. A mold structure according to claim 21, wherein said first of said seal means has a durometer substantially equal to 70 and said second of said seal means has a durometer substantially in the range of 50 to 60.

24. A mold structure for forming a gasket on a predetermined portion of a frangible sheet, comprising:
  at least two cooperating mold sections having facing surfaces defining a chamber for receiving the sheet;
  seal means positioned in at least one of the facing surfaces of said mold sections to resiliently support the sheet within the sheet receiving chamber, and to cooperate with the predetermined portion of the sheet to at least in part define a gasket forming cavity corresponding to the gasket to be formed on the sheet;
  said seal means being disposed in a groove defined in said at least one of the facing surfaces, said groove defining a first wall portion, said seal means being disposed in said groove adjacent said first wall portion;
  clamping means positioned in said groove for urging said seal means against said first wall portion to retain said seal means in said groove; and
  inlet means for introducing a flowable gasket material into the gasket forming cavity.

25. A mold structure according to claim 24 wherein said first wall portion terminates along an edge defining a portion of said gasket forming cavity.

26. A mold structure according to claim 24 wherein said groove defines a second wall portion spaced from said first wall portion, and a third wall portion adjacent said first wall portion, said seal means positioned adjacent said first and third wall portions, said clamping means positioned between said seal means and said second wall portion and further including means for urging said seal means against said third wall portion.

27. A mold structure according to claim 24 wherein said groove defines a second wall portion spaced from said first wall portion, and said clamping means is located between said seal means and said second wall portion, said clamping means including a clamping element engageable with said seal means, and a first forcing means for urging said clamping element towards said first wall portion, thereby urging said seal means against said first wall portion.

28. A mold structure according to claim 27 wherein said groove defines a third wall portion adjacent said clamping element, said clamping means further including a second forcing means for urging said clamping element towards said third wall portion.

29. A mold structure according to claim 27 wherein said groove defines a third wall portion adjacent said first wall portion, said seal means including a sealing surface contacting said first wall portion and a clamping surface contacting a cooperating facing surface of said clamping element, said clamping surface being inclined relative to said sealing surface such that movement of said clamping element towards said first wall portion urges said seal means against both said first wall portion and said third wall portion.

30. A mold structure for forming a gasket on a predetermined portion of a frangible sheet, comprising:
at least two cooperating mold sections having facing surfaces defining a chamber for receiving the sheet;
seal means positioned in each of the facing surfaces of said mold sections to resiliently support the sheet within the sheet receiving chamber, and to cooperate with the predetermined portion of the sheet to at least in part define a gasket forming cavity corresponding to the gasket to be formed on the sheet;
each of said seal means being disposed in a groove defined in its respective facing surface, said groove defining a first wall portion, each said seal means being disposed in said groove adjacent said first wall portion;
clamping means positioned in each said groove for urging each said seal means against its respective first wall portion to retain said seal means in said groove and
inlet means for introducing a flowable gasket material into the gasket forming cavity.

* * * * *

UNITED STATES PATENT AND TRADEMARK OFFICE
CERTIFICATE OF CORRECTION

PATENT NO. : 4,688,752
DATED : August 25, 1987
INVENTOR(S) : Werner W. Barteck and Theodore H. Gordon It is certified that error appears in the above-identified patent and that said Letters Patent are hereby corrected as shown below:

Column 1, line 42, "cofiguration" should read --configuration--;

Column 2, line 45, "on" should read --of--;

Column 4, line 10, "sectioal" should read --sectional--;

Column 5, line 29, "26a" should read --26a'--; same column, line 43, "38" should read --39--;

Column 6, line 46, "constructe" should read --construct--; same column, line 62, "26a" should read --26a'--;

Column 7, line 6, "26a" should read --26a'--;

Column 9, line 25, " hydoxyl" should read --hydroxyl--; same column, line 29, "MID" should read --MDI--.

In Figs. 1, 2 and 3 of the drawings: reference numeral "110" should be added to Fig. 1; in Fig. 2 "26a" (referring to the inclined surface of the clamping member 26) should read --26a'--; and in Fig. 3 "38" should read --39--, all as shown in the attached drawings.

Signed and Sealed this

Eighth Day of March, 1988

*Attest:*

DONALD J. QUIGG

*Attesting Officer*  *Commissioner of Patents and Trademarks*